United States Patent [19]
Coffin et al.

[11] Patent Number: 5,687,039
[45] Date of Patent: Nov. 11, 1997

[54] DUAL FIXED-FINGER PICKER FOR DATA CARTRIDGES

[75] Inventors: Paul Coffin; Gregg S. Schmidtke, both of Fort Collins, Colo.

[73] Assignee: Hewlett-Packard Company, Palo Alto, Calif.

[21] Appl. No.: 641,457

[22] Filed: Apr. 30, 1996

[51] Int. Cl.⁶ ............................ G11B 15/68; G11B 17/22
[52] U.S. Cl. .................................................. 360/92; 369/36
[58] Field of Search .................................. 360/92; 369/36, 369/191

[56] References Cited

U.S. PATENT DOCUMENTS

| | | | |
|---|---|---|---|
| 4,918,548 | 4/1990 | O'Donnell et al. | 360/92 |
| 4,984,108 | 1/1991 | Grant | 360/92 |
| 5,014,255 | 5/1991 | Wanger et al. | 369/36 |
| 5,043,962 | 8/1991 | Wanger et al. | 369/36 |
| 5,101,387 | 3/1992 | Wanger et al. | 369/36 |
| 5,157,565 | 10/1992 | Domel | 360/92 |
| 5,182,687 | 1/1993 | Campbell | 360/92 |
| 5,363,258 | 11/1994 | Coles et al. | 360/92 |
| 5,456,528 | 10/1995 | Daiziel | 312/9.46 |

Primary Examiner—A. J. Heinz
Attorney, Agent, or Firm—Augustus W. Winfield

[57] ABSTRACT

A picker for a computer information storage library. The computer information storage library includes at least one computer information drive, storage locations for data cartridges, a picker and a transport mechanism. The picker includes a sleeve for holding a cartridge and a moveable thumb. The transport mechanism provides displacement in two orthogonal dimensions for the picker. The moveable thumb provides displacement in a third dimension orthogonal to the movement of the transport mechanism. Data cartridges include two openings in a bottom surface. The thumb includes fixed fingers with bent tips that engage the openings in the bottom surface of the data cartridges. Data cartridges are removed from a drive or storage by hooking the tips of the fingers into the data cartridge openings, and then moving the thumb relative to the sleeve to pull the cartridge into the sleeve. The picker also includes a rigid thumb for pushing a data cartridge out of the sleeve and into a drive or into a storage location. In addition, data cartridge drives of interest have a cartridge alignment and spindle engagement mechanism that is activated mechanically by a handle on the front of the drive. The picker also includes a handle manipulation spring that is used to raise and lower the handle on the drive.

2 Claims, 10 Drawing Sheets

DUAL FIXED-FINGER PICKER FOR DATA CARTRIDGES

FIELD OF THE INVENTION

This invention relates generally to robotic picker mechanisms and more specifically to a robotic picker for data cartridges for computer information storage libraries.

BACKGROUND OF THE INVENTION

A computer information storage library (also known as an autochanger) typically includes at least one computer information drive mechanism, a media storage system for computer information media or data cartridges, a picker (also called a gripper or manipulator or engagement mechanism) for inserting media or cartridges into drives or storage locations and for extracting media or cartridges from drives or storage locations, and a transport mechanism for moving the picker and media or cartridges between drives and storage. Computer information storage drives with removable media include, for example, disk drives (magnetic and optical) and magnetic tape drives. Media storage systems include, for example, carousels, cylindrical silos, and slotted magazines or racks. There is a wide spectrum of transport assemblies. For example, cartridges may be translated and rotated with four or more degrees of freedom by an anthropomorphic robot arm or cartridges may simply be translated in two dimensions. Alternatively, instead of a separate transport mechanism, the media storage system may be moveable. For example, a carousel may rotate to position a cartridge at a stationary drive. Alternatively, a drive may be moved by a transport system to a stationary cartridge location. There is also a wide spectrum of pickers. For example, friction grippers with multiple fingers may be used, various media or cartridge features may be hooked or clamped, or cartridges may be simply pushed or pulled.

In general, for any robotic picker, it is desirable to reduce complexity, weight and number of parts. In particular, it is desirable to reduce the number of electrically active devices (such as sensing devices and motors) on moving system components, to eliminate potential sources for malfunction and to eliminate problems associated with moving electrical connections. There is a need for a picker with a reduced number of electrical components.

A computer information drive mechanism may have a latch, handle or door that must be manipulated to insert or remove a medium or cartridge. Sometimes, the drive mechanism may include an automatic powered actuator for a latch, handle or door. If the latch, handle or door is not power actuated, the library picker may need to include an additional capability for manipulating the latch, handle or door on the drive.

There is a ongoing need for improved pickers for computer information cartridges and a particular need for a picker for cartridges combined with a capability for manipulating a latch, door or handle.

SUMMARY OF THE INVENTION

A picker for data cartridges has a moveable thumb and two fingers fixed relative to the thumb. The thumb is mounted in a sleeve. The sleeve has guides for holding a data cartage during transport. The picker removes cartridges from drives or storage locations and inserts cartridges into drives or storage locations. In addition, the picker is adapted to manipulate a drive handle. All the picker parts are fixed relative to the thumb. The resulting picker provides low cost, reliability and ease of fabrication.

Data cartridges of interest have two openings in a bottom surface. The corresponding picker has two fixed fingers, each having a tip, each tip having a bend or hook suitable for engaging the openings in the bottom surface of the data cartridge. Cartridges are extracted from drives or storage into guides in the sleeve by pulling at the openings in the data cartridges with the hooked fingers. The thumb also has a rigid flat surface for pushing cartridges out of the sleeve into a drive or storage location.

In addition, for a particular embodiment, a tape drive of interest has a handle. When the handle is raised, a tape cartridge may be freely inserted or removed. When the handle is lowered, reference surfaces on the cartridge are aligned to reference surfaces in the drive and a gear on the surface of a spindle in the cartridge is engaged with a corresponding motor driven gear in the drive. The picker includes an additional flat spring surface for manipulating the handle.

DETAILED DESCRIPTION OF THE PREFERRED EMBODIMENT OF THE INVENTION

Figure 1:
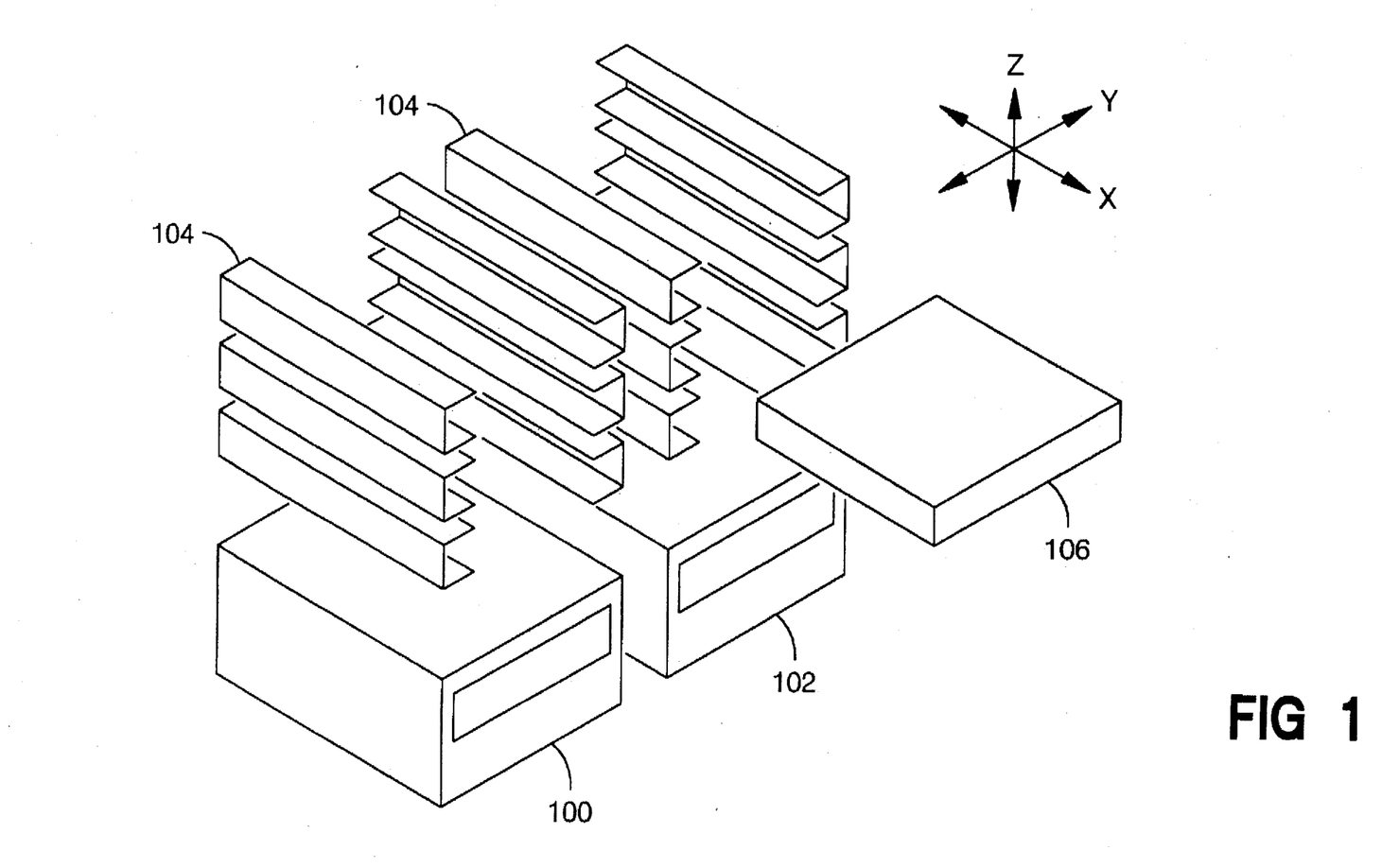
FIG. 1 is a simplified perspective view of portions of a computer information storage library.

FIG. 1 is a simplified perspective view of a computer information storage library in accordance with an example embodiment of the invention. The library illustrated in FIG. 1 has two computer information drive mechanisms, 100 and 102, mounted in the base of a cabinet (not illustrated). At least one column of cartridge storage locations 104 above the drives is used to store data cartridges. A compact example embodiment of a library using the picker of the invention may have only one column of storage locations and a larger embodiment may have three or more columns. The storage locations 104 may be defined, for example, by "C" shaped brackets as illustrated, "L" shaped brackets, shelves, edge guides, or other suitable holders. Preferably, the storage locations 104 include features to prevent cartridges from vibrating or shaking out of the storage locations. A transport mechanism (not illustrated) provides horizontal (Y) and vertical (Z) displacement of a picker 106 and supports the picker 106 at a fixed orientation relative to the displacement path. The picker 106 includes a sleeve with guides for carrying a data cartridge and a moveable thumb (not illustrated in FIG. 1). The thumb includes a flat surface for pushing a cartridge into a drive or storage location and two fixed fingers for extracting a cartridge from a drive or storage location. Examples of suitable transport mechanisms for a computer information storage library configured as generally depicted in FIG. 1 may be found in U.S. Pat. Nos. 5,101,387, 5,043,962 and U.S. patent application Ser. No. 08,296,054.

Figure 2:
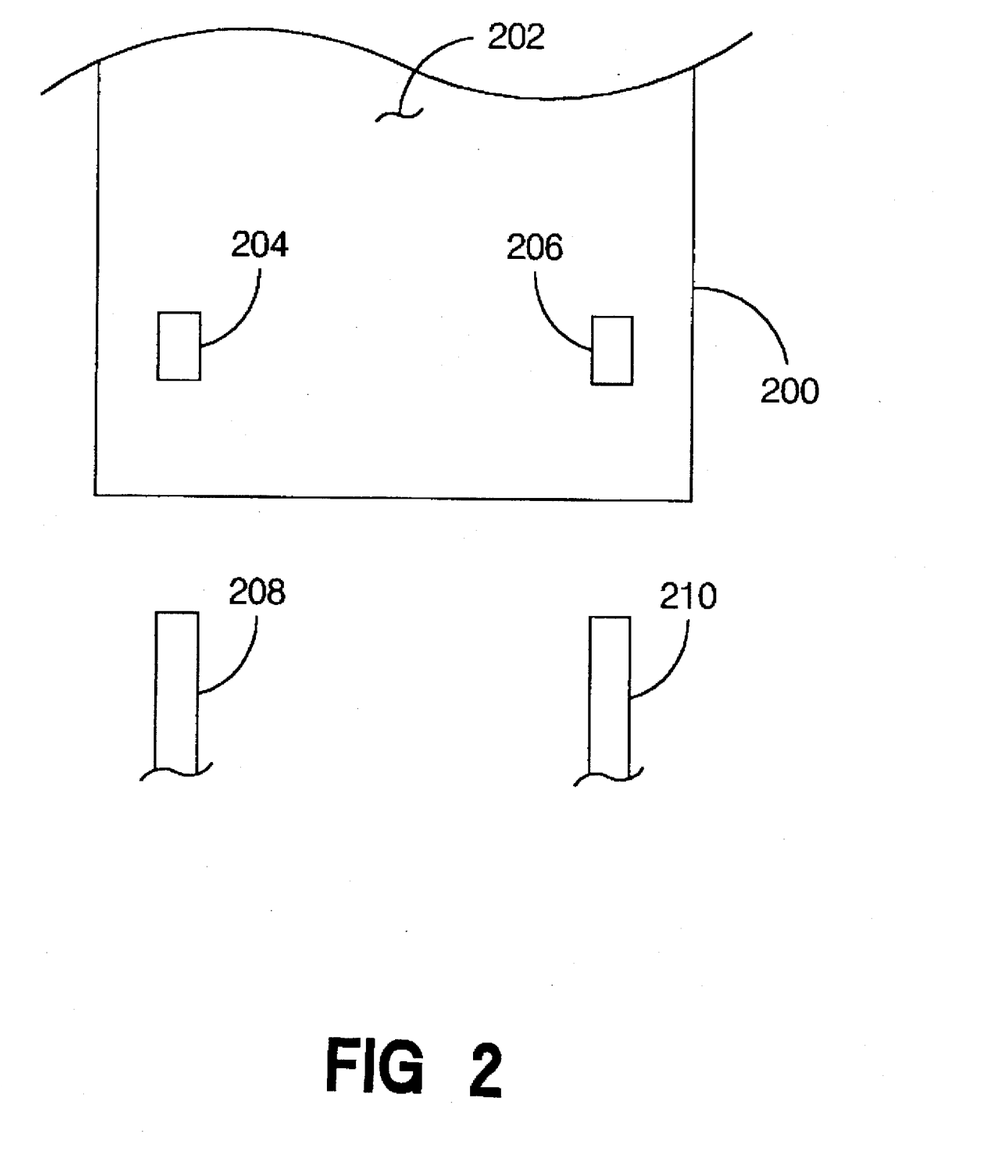
FIG. 2 is a plan bottom plan view of a media cartridge and picker fingers.

FIG. 2 illustrates a bottom view of a data cartridge of a general type of interest to the invention. A data cartridge 200 has a bottom surface 202, with first and second openings (204, 206) in the bottom surface. The openings 204 and 206 may pass completely though the bottom surface 202, or they may simply be indentations partially into the bottom surface 202. Either or both of the openings 204 and 206 may optionally be along an edge, so that part of a side wall also has an opening. The corresponding picker has two fixed fingers (208, 210) made of thin material, each finger having a bent tip (viewable in FIG. 3) suitable for engaging the openings (204, 206) in the data cartridge 200.

Figure 3:
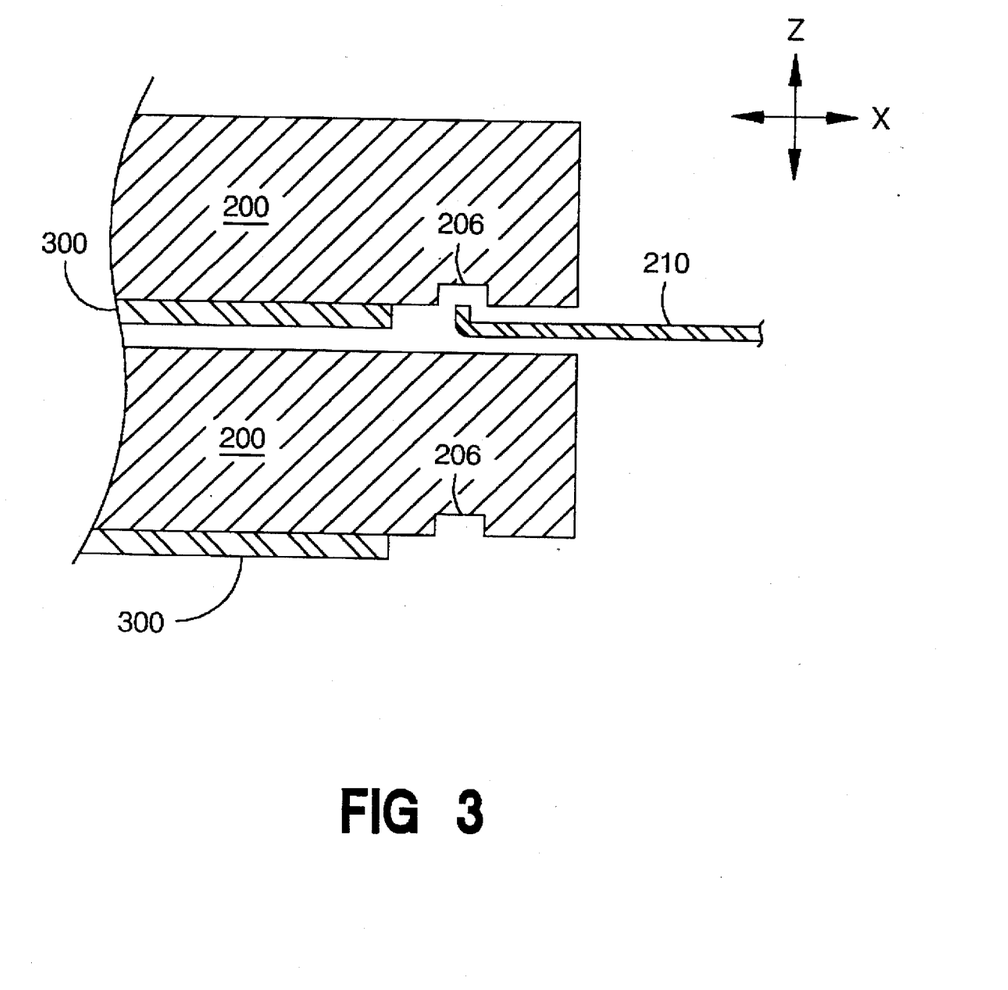
FIG. 3 is a side view of two cartridges positioned as in a storage rack and a picker finger.

FIG. 3 illustrates two data cartridges 200 within data cartridge storage locations (FIG. 1, 104). As illustrated in FIG. 3, shelves or brackets 300 do not extend all the way to the end of the data cartridges so that the fixed fingers (FIG. 2, 208, 210) have access to the openings (FIG. 2, 204, 206). Preferably, within the storage locations, the vertical spacing between data cartridges is as small as possible to maximize the number of cartridges to be stored. Therefore, the fixed fingers (FIG. 2, 208, 210) must be thin to fit between the data cartridges in the storage locations. As illustrated in FIG. 3, finger 210 is preferably a simple fixed piece of thin material, sufficiently rigid to support its own weight, with a bend or hook at the tip sufficient to engage one of the openings in the bottom of the data cartridge for pulling the data cartridge into the picker. The transport mechanism moves the picker vertically (FIG. 1, dimension Z) and horizontally (FIG. 1, dimension Y) to align the picker with a stationary data cartridge (either in a storage location or in a drive). The thumb then moves horizontally (FIG. 1, dimension X) on the sleeve to align the fingers (FIG. 2, 208, 210) below a cartridge. Then the transport mechanism moves the picker vertically to insert the tips of the fingers into the openings (FIG. 2, 204, 206) of the cartridge. The thumb then moves horizontally (FIG. 1, dimension X) to pull the data cartridge from a storage location or from a drive and into the sleeve.

Figure 4:
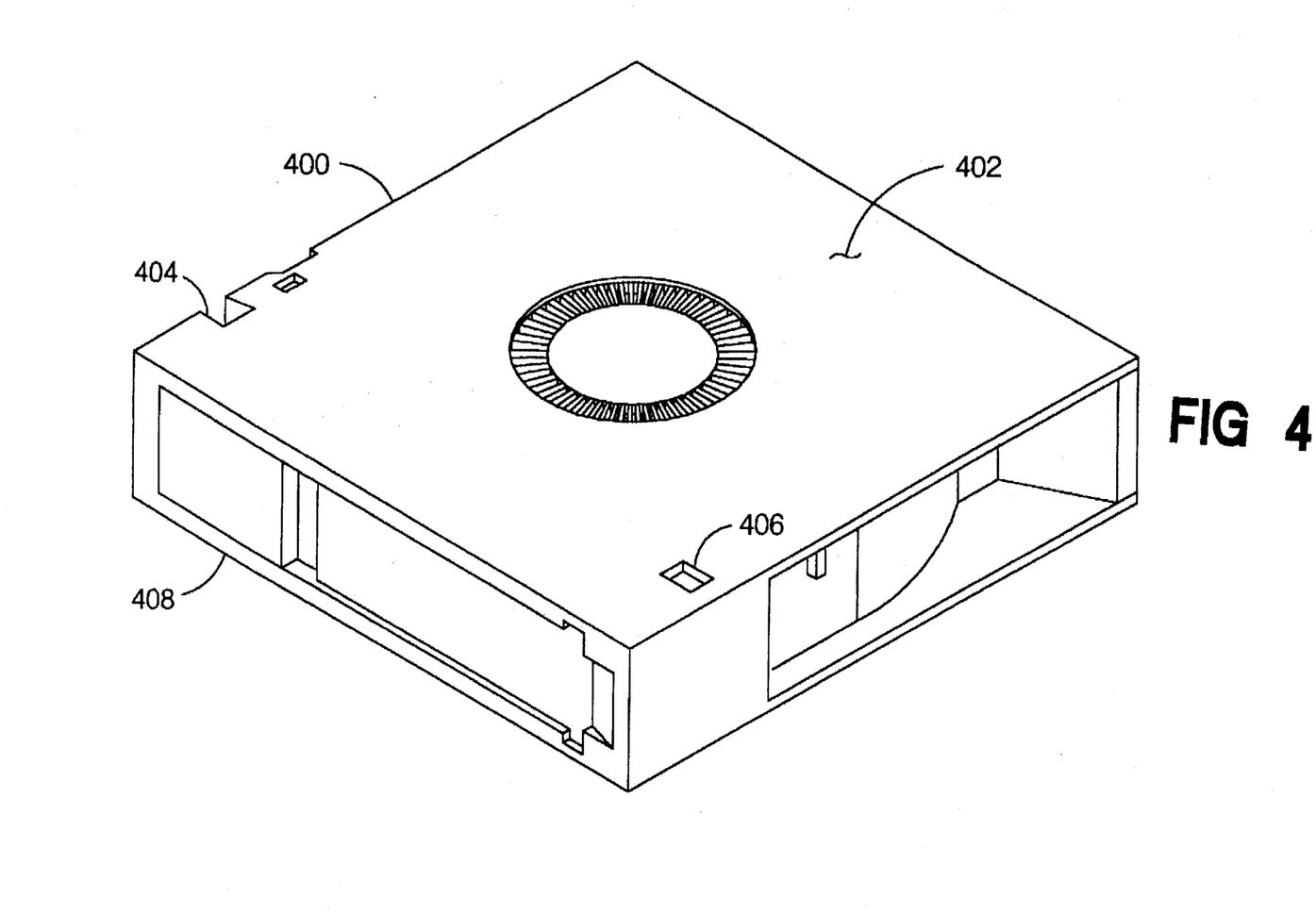
FIG. 4 is a perspective bottom view of a particular tape cartridge illustrating features suitable for picking.

FIG. 4 is a perspective bottom view of a data cartridge for a particular embodiment of the invention. Data cartridge 400 is a tape cartridge, called a DLT cartridge, available from Quantum Corporation, Milpitas, Calif. Tape cartridge 400 has two openings (404, 406) in the bottom surface 402. Note that opening 404 also opens into a side wall, but that is not important to the invention. Note also that opening 404 is further away from the end surface 408 than opening 404. Therefore, corresponding picking fingers have different lengths.

An associated tape drive for the tape cartridge 400 of FIG. 4, also available from Quantum, has a cartridge ejection spring. When a tape cartridge is inserted into the tape drive, it must be forced against the ejection spring. When the tape cartridge is inserted completely into the tape drive, a solenoid activated latch in one side of the tape drive may be used to hold the tape cartridge in place against the ejection spring. When the solenoid activated latch releases a tape cartridge, the ejection spring pushes the tape cartridge partially out of the drive so that the front of the tape cartridge extends about 12 mm beyond the front of a drive bezel.

The tape drive also has an alignment and spindle motor engagement mechanism. When the alignment and spindle motor engagement mechanism is released, and the solenoid activated latch is released, a tape cartridge may be freely inserted or removed. When the alignment and spindle motor engagement mechanism is engaged, reference surfaces on the cartridge are aligned to reference surfaces in the drive and a gear on the surface of a spindle in the cartridge is engaged with a corresponding motor driven gear in the drive. In some other embodiments of the tape drive, the cartridge alignment and spindle gear engaging mechanism is powered by a motor. In the tape drive of interest to the invention, the powered spindle gear engaging mechanism is eliminated to reduce cost, space (multiple drives) and complexity. Instead, in the picker of the invention, the cartridge alignment and spindle gear engaging mechanism is mechanically activated by a handle. A unique handle design (discussed below in conjunction with FIG. 7) has been implemented to enable the cartridge alignment and spindle gear engaging mechanism to be engaged by the library transport mechanism and picker. The picker includes a flat handle manipulation spring for manipulating the drive handle, as discussed below in conjunction with FIG. 5 and FIGS. 8A–8C.

Figure 5:
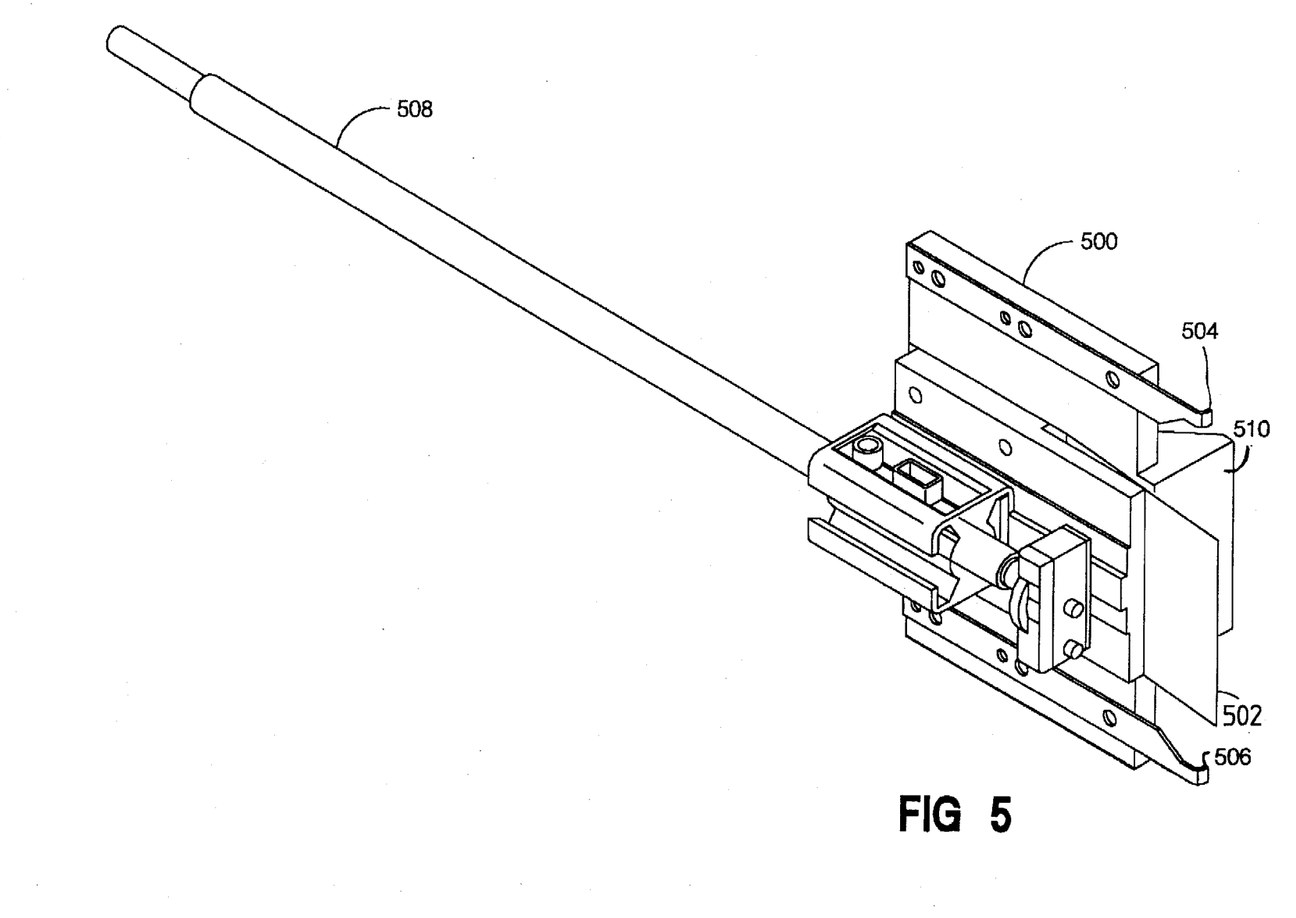
FIG. 5 is a perspective bottom view of a moveable thumb with picker fingers and a handle manipulation spring.

FIG. 5 is a perspective bottom view of an embodiment of a thumb 500. The thumb 500 includes two fixed fingers (504, 506) and a fixed handle manipulation spring 502. Finger 506 engages opening 406 (FIG. 4) and finger 504 engages opening 404 (FIG. 4). Note that finger 506 is slightly longer than finger 504. Surface 510 is used to push cartridges out of a sleeve and into a drive or into a storage location. Thumb 500 is driven by a lead screw 508. The motor for the lead screw is not illustrated, but a suitable arrangement may be seen in U.S. Pat. No. 5,014,255 (Wanger et al).

In the particular embodiment of the library, the vertical spacing between cartridges in storage locations is 4 mm±1 mm. Therefore, the available space for inserting the fingers is about 2 mm. In the particular embodiment of the thumb illustrated in FIG. 5, the handle manipulation spring 502 is fabricated of thin (0.5–1.0 mm) fully hardened stainless spring steel. The fingers are fabricated from the same material with an overall height including the length of the "hook" on the tip of approximately 1.5–2.0 mm.

Figure 6:
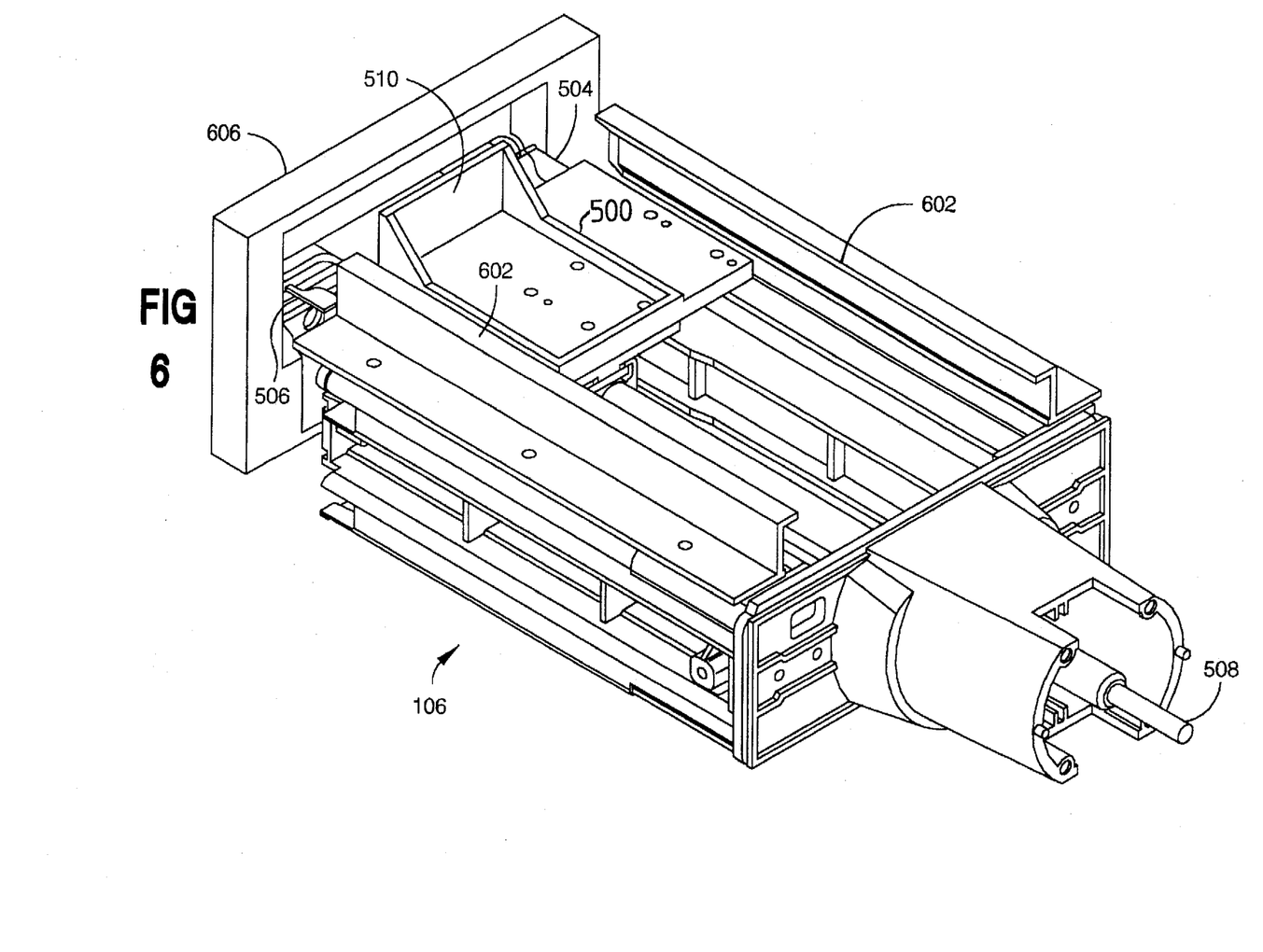
FIG. 6 is a perspective top view of the picker including the thumb of FIG. 5 and a drive bezel.

FIG. 6 is a perspective top view of the overall picker 106. The picker includes a sleeve with guides 602 for holding a data cartridge and the sliding thumb 500. FIG. 6 also illustrates a bezel 606 on a drive (not illustrated). In FIG. 6, fingers 504 and 506 are positioned within an opening in the bezel 606.

Figure 7:
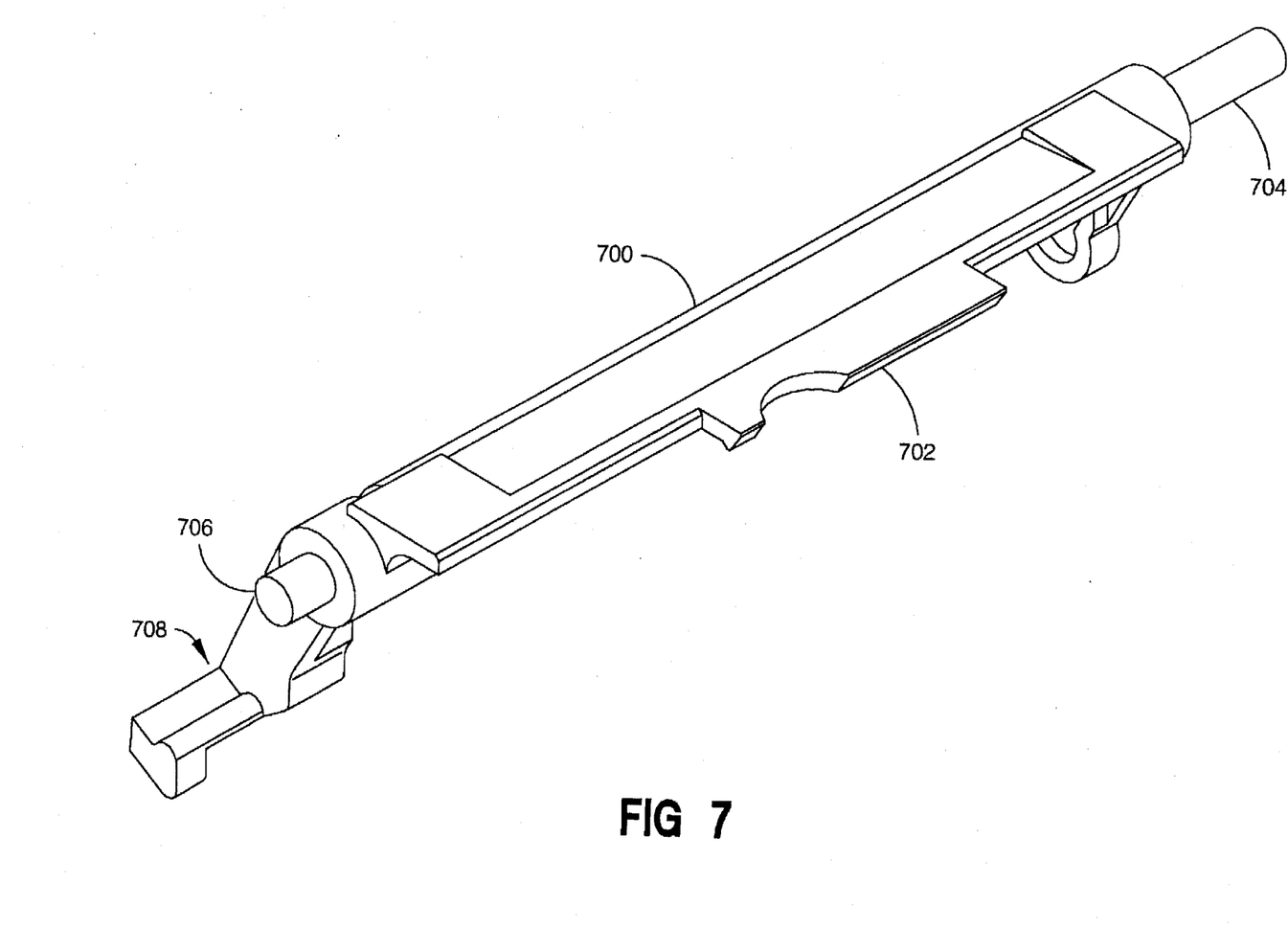
FIG. 7 is a perspective view of a drive handle.

As discussed above, drives for DLT cartridges have a handle, with an optional powered actuator for the handle. In a specific library implementation using the dual fixed-finger picker, the standard drive handle is replaced with a unique custom handle and bezel (FIG. 6, 606) suitable for actuation by the picker. Using the picker for handle actuation enables drive cost and space reduction by eliminating the power actuator. FIG. 7 is a perspective view of the custom handle 700. An extension 702 barely protrudes beyond the front of the bezel when the handle 700 is a raised position, enabling the picker to pass close to the front of the drives regardless of the handle position. Hinges 704 and 706 mate with corresponding surfaces in the drive and the structure generally indicated by reference number 708 is compatible with the standard drive handle.

Figure 8A:
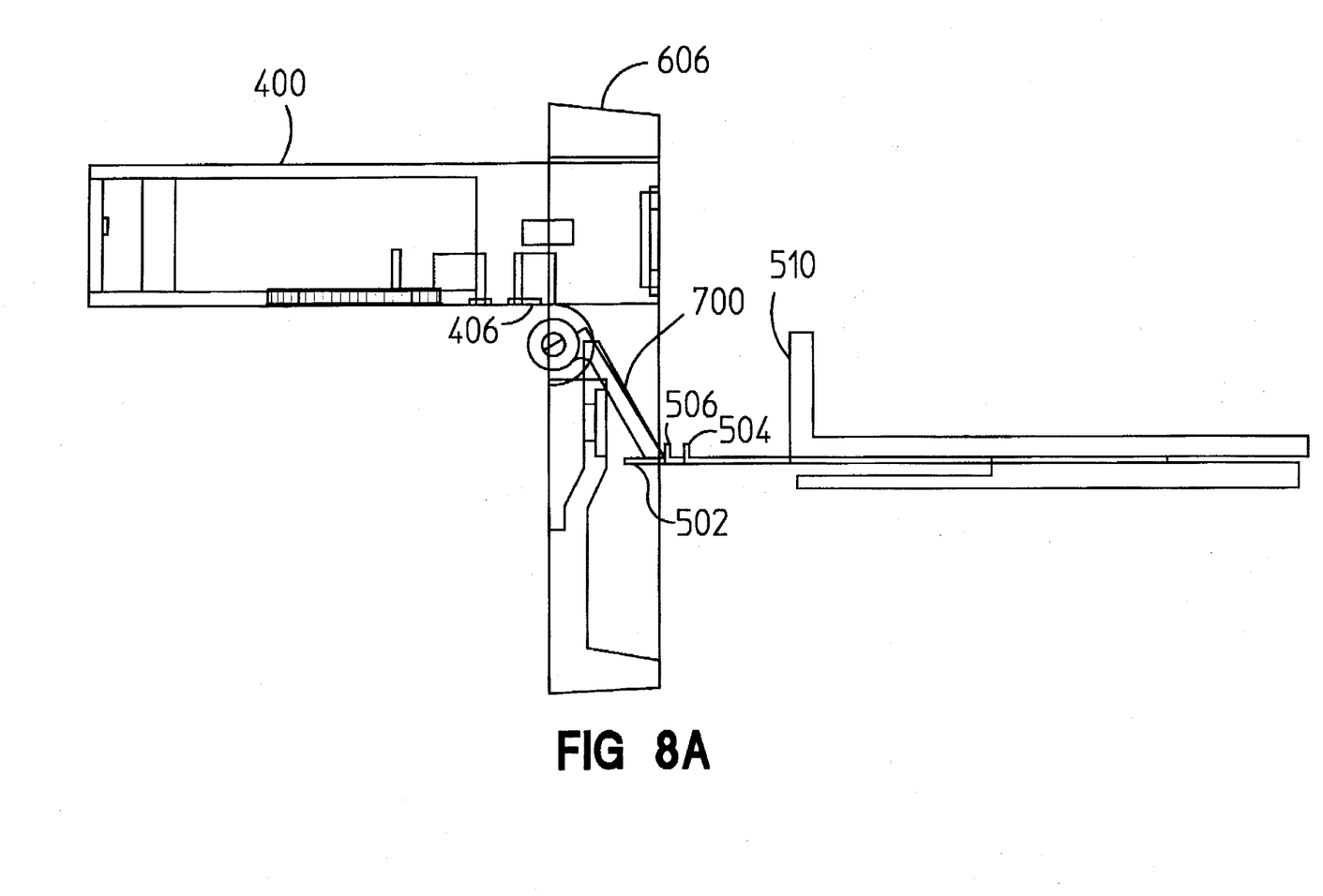
FIG. 8A is a side view of a data cartridge, a drive handle, and the handle manipulation spring, with the drive handle in the fully lowered position and the handle manipulation spring in position for raising the drive handle.

FIG. 8A illustrates a tape cartridge 400 inside a tape drive, the bezel 606 on the front of the drive, and the handle 700 on the drive. In FIG. 8A, the handle 700 is in its most downward position, so that the cartridge 400 is clamped against reference surfaces and a spindle motor in the drive is engaged. In FIG. 8A, the picker 105 (FIGS. 1 and 6) and sliding thumb 500 (FIGS. 5 and 6) has been positioned so that the handle manipulation spring 502 is in an initial position for raising the handle 700.

Figure 8B:
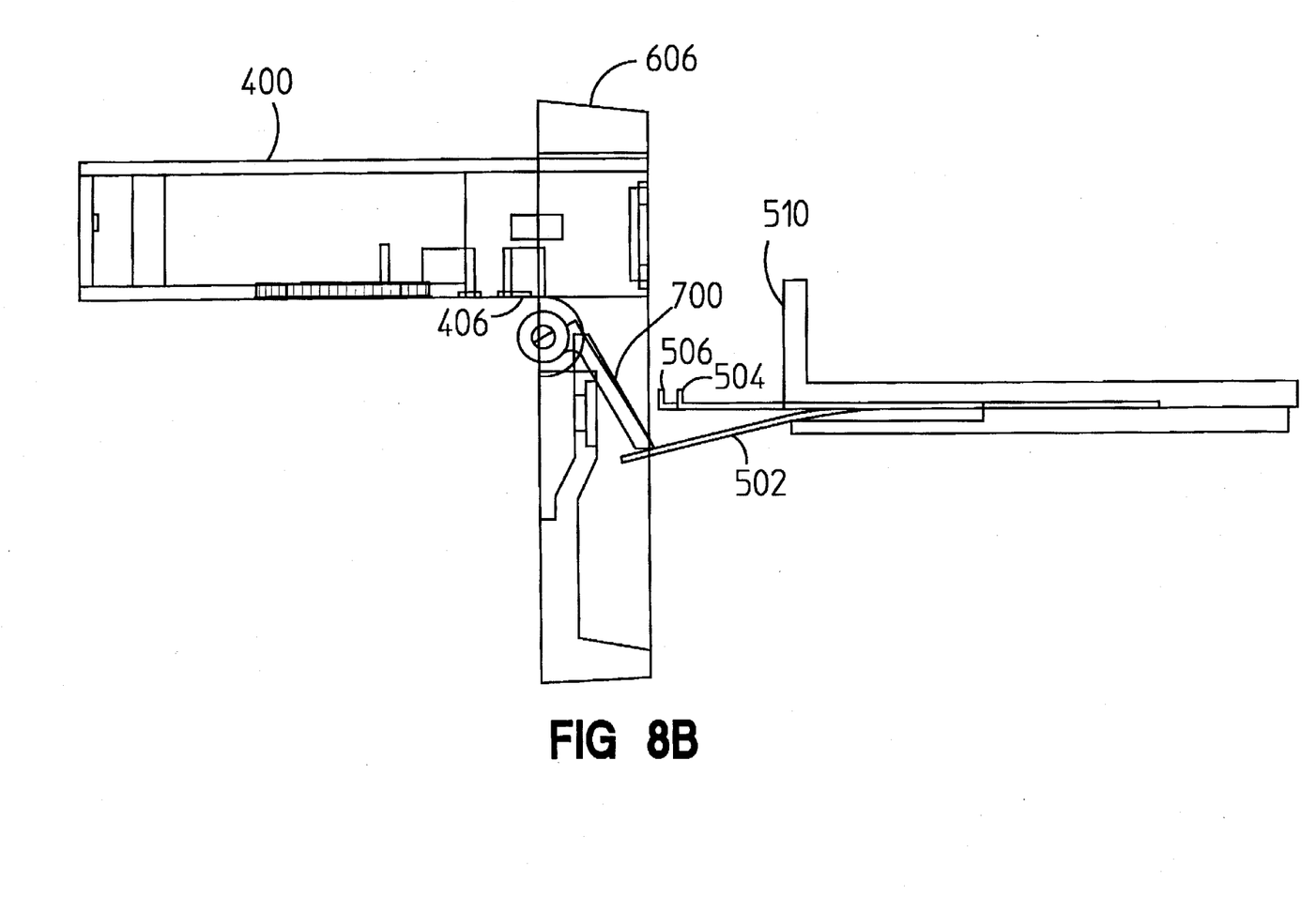
FIG. 8B is the cartridge, drive handle, and handle manipulation spring of FIG. 8A with the drive handle at an intermediate position.

In FIG. 8B, the picker 106 (FIGS. 1 and 6) has been moved vertically upward. As the picker 106 moves upward, the handle manipulation spring 502 bends. The bent handle manipulation spring 502 puts pressure on the beveled surface on the end of the handle 700, providing both an upward and an outward force on the handle 700 sufficient to rotate the handle counterclockwise as viewed in FIGS. 8A–8C.

Figure 8C:
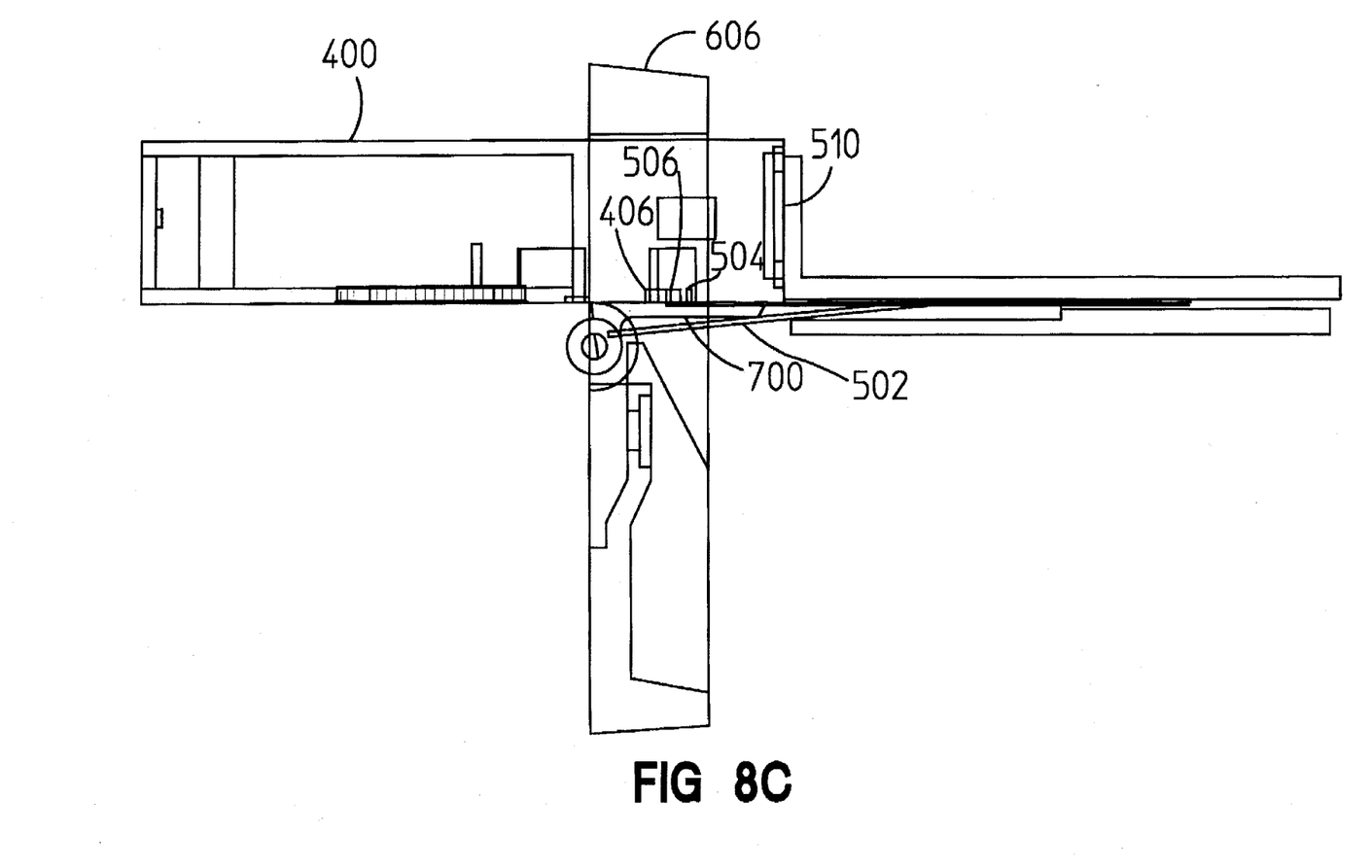
FIG. 8C is the cartridge, drive handle, and handle manipulation spring of FIG. 8B with the drive handle in the fully raised position.

In FIG. 8C, the handle 700 has been completely raised. When the handle 700 is raised, the tape cartridge 400 remains in the drive, held by the solenoid activated latch (not illustrated) on one side of the tape drive. When the latch is released (by electronic command), the ejection spring in the drive moves the tape cartridge 400 outward so that the tape cartridge extends about 12 mm from the front of the bezel 606. The sliding thumb 500 is then moved horizontally (to the left in FIG. 8C) a sufficient distance to ensure that the surface 510 is pushing the cartridge against the ejection spring. With the surface 510 in contact with the tape cartridge 400, the fingers 504 and 506 align with their respective openings 404 and 406. By raising the picker 106 and moving the thumb 500 horizontally to the right, the cartridge 400 is pulled from the drive into guides 602 on the picker 106 (FIG. 6). Note in FIG. 8C that the handle manipulation spring 502 remains underneath the raised handle.

For insertion of a tape cartridge 400 into a tape drive, the spring surface 502 is first positioned at the top surface of the handle 700. The cartridge is pushed out of the guides 602 (FIG. 6) by the thumb surface 510, to a known distance such that the cartridge is completely inserted into the drive. The solenoid activated latch on the side of the drive is then activated to hold the cartridge in place. The sliding thumb 500 is then moved outward (to the right in FIG. 8C) to a horizontal position corresponding to the horizontal position in FIG. 8B (note, however, that the handle manipulation spring 502 is above the fully raised handle 700). The picker 106 is then lowered vertically, causing the handle manipulation spring 502 to exert downward force on the handle 700. As the handle is lowered, the handle manipulation spring is 502 deflected upward.

In summary, the embodiment of the picker illustrated in FIGS. 5 and 6 can pull tape cartridges out of storage locations or tape drives into the carrier, can push tape cartridges out of the carrier into storage locations or tape drives, and can raise or lower a special drive handle, all with simple fixed fingers and a fixed drive manipulation spring. The resulting picker provides low cost, reliability and ease of fabrication.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A picker for a data cartridge, the data cartridge having a bottom surface with first and second openings in the bottom surface, the picker comprising:

a thumb that is moveable, the thumb adapted to push the data cartridge into a storage location;

first and second fingers, rigidly attached to the thumb, the first and second fingers being flexible but not actively moved relative to the thumb, the first and second fingers corresponding to the first and second openings respectively, each finger having a tip adapted to hook into its corresponding opening; and the thumb adapted so that it can be moved to cause the first and second fingers to pull on the first and second openings, thereby extracting the data cartridge from the storage location without gripping the cartridge.

2. The picker of claim 1, the picker mounted on a carriage that can be moved vertically, the picker further adapted for use with a drive for the data cartridge, the drive including a handle, the handle having a raised position and a lowered position, such that the data cartridge may be inserted into the drive or extracted from the drive only when the handle is in the raised position, the picker further comprising:

a handle manipulation spring, rigidly attached to the thumb, so that when the handle manipulation spring is positioned below the handle when the handle is in the lowered position, and the thumb is moved vertically, the handle manipulation spring forces the handle to the raised position.

* * * * *